R. H. BLOOMER.
RUBBING POST.
APPLICATION FILED SEPT. 8, 1914.
1,225,920.
Patented May 15, 1917.
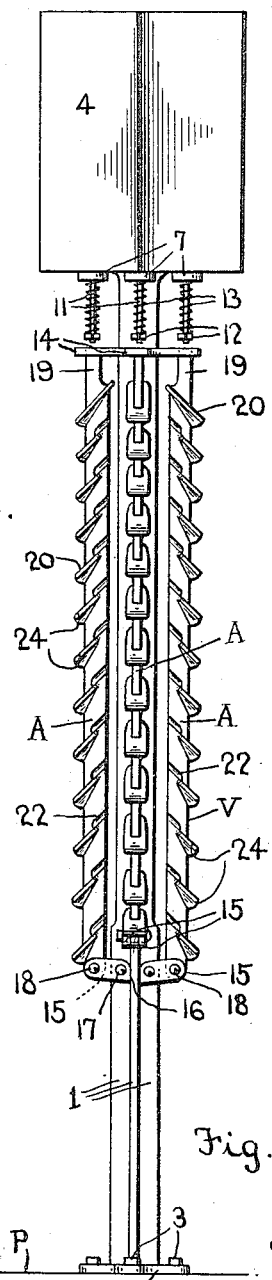
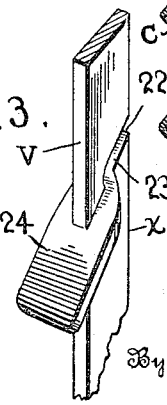
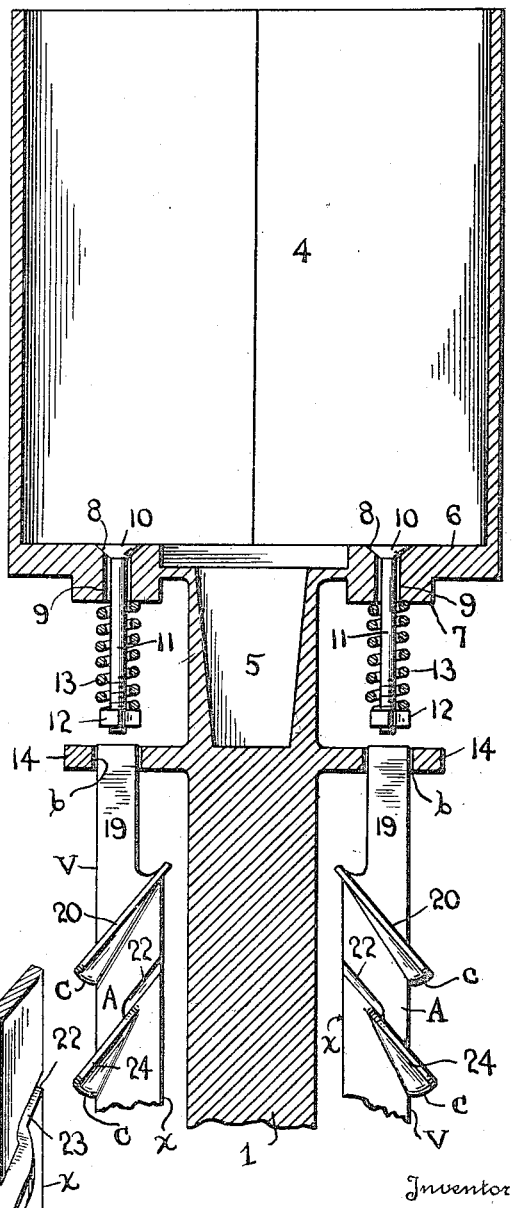
Inventor
R. H. Bloomer
Witnesses

UNITED STATES PATENT OFFICE.

REUBIN H. BLOOMER, OF COUNCIL BLUFFS, IOWA.

RUBBING-POST.

1,225,920.  Specification of Letters Patent.  Patented May 15, 1917.

Application filed September 8, 1914. Serial No. 860,638.

*To all whom it may concern:*

Be it known that I, REUBIN H. BLOOMER, a citizen of the United States, and a resident of Council Bluffs, in the county of Pottawattamie and State of Iowa, have invented certain new and useful Improvements in Rubbing-Posts, of which the following is a specification, reference being had to the accompanying drawings.

This invention has relation to certain new and useful improvements in rubbing posts.

The object of my invention is to provide a rubbing post arranged to be given a firm support in a hog pen or run, and includes a plurality of vertically reciprocating rub bars, each of which when actuated unseats a valve, permitting a liquid insecticide or oil to flow down the bars and spread over the animal actuating the rubbing bar.

Another object is to provide a rubbing post so constructed as to accommodate hogs of all sizes, the arrangement being such that there will be no unseating of the valves should a hog go to sleep lying against a rubbing bar.

A further object is to provide a rubbing post including a vertically reciprocating rub bar provided with a plurality of diagonally extending drain channels, each of which communicates with an extending rib projecting beyond the sides and outer edge of the bar.

With these and other objects in view, the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification, and in which like numerals of reference indicate similar parts in the several views:

Figure 1, shows an elevational view of a rubbing post embodying my invention.

Fig. 2, shows an enlarged sectional view disclosing a fragmentary portion of the upper end of the post.

Fig. 3, is a detail of one of the ribs, showing a fragmentary portion of a rub bar.

In my present invention I provide a rubbing post which is preferably secured to a platform P, sunk so that the top of the platform comes level with the surrounding ground.

The post proper comprises a standard cruciform in cross-section and including four webs 1, which end in the apertured securing base 2, through which pass suitable bolts 3. As shown at *a*, in Fig. 1, the upper portion of each web is slightly less in width than the lower portion. This is done so that the rear edges of the reciprocating rub bars will not contact with the webs.

At its upper end the standard is provided with the reservoir 4, having a centrally disposed settling chamber 5, within which is collected the sediment and impurities within the insecticide or oil.

Within the bottom 6, of the reservoir are located a plurality of valve seats 8, having the enlarged drain openings 9, these openings passing through the bosses 7, as clearly shown in Fig. 2.

Held to each valve seat 8, is a valve 10, having an extending stem 11 carrying a nut 12, a spring 13, being interposed between each nut 12, and a boss 7, to insure the normal firm seating of each valve.

The stems 11, are of a diameter less than the diameter of the drain openings 9, to insure a free flow of the liquid through the valve openings.

As clearly shown extending parallel with the bottom 6, of the reservoir 4, are four similar yokes 14, these yokes having the apertures *b*, the yokes preferably forming an integral part of the standard.

Secured near the lower portion of the standard and immediately below the yokes upon opposite sides of the webs 1, are the links 15, these links being used in sets of twos, and pivotally held to the standard by means of the pivot pin 17. As shown in Fig. 1, the links 15, end in a straight portion 16, arranged to stop in one position against an adjacent web 1, in the manner insuring these links extending outward in a horizontal plane.

Each set of links 15, carries a pin 18, to each of which is pivotally secured the lower end of a rub bar A, the rub bars being capable of being vertically reciprocated and having their upper ends slidably held within the yoke openings *b*.

As shown in Fig. 2, each rub bar A, ends in a guide neck 19, and these guide necks are held within the yoke openings *b*, immediately below the valve stems 11, so that an upward movement of a bar A, results in the adjacent valve being unseated.

These links 15, limit the downward movement of the bars A, the upward movement being limited in that the lower end of the bars A, come in contact with the webs 1, near their lower ends.

At its upper end each bar A, has a circumscribing obliquely held collar 20, with a rounded underface c. These collars prevent any oil or insecticide sliding down the rear or inner edge x, of the rub bars, and insure the material draining downwardly to drop upon the first rib and then successively over and through the adjacent ribs 24, and drain channels 22.

It is of course understood that owing to the curved underface c, of the collar 20, the insecticide or oil covers and glides down both sides or faces of the bars, as well as the outer edge v, of each bar.

As shown the collar 20, and the ribs 24, extend in parallel spaced relation, the ribs 24, which also have a curved underface forming a continuation of a channel 22.

The channels 22, have the bottoms 23, at right angles to the faces of the bars, A, as shown in Fig. 3, and extend more than half way across the bar. Forming a continuation with the bottoms 23, are the ribs 24, the upper faces of which lie in a plane coincident with the face of the bottoms 23. The ribs project beyond the forward edge v, of the bars, as well as beyond the sides of the bars and are gradually reduced in width rearwardly toward the channels. This insures the insecticide or oil draining toward the outer edge of each rib which have rounded underfaces increasing the oil bearing surface of each rib, while preventing any liquid dropping off of the ribs as would be the case where the ribs end in sharp corners or edges.

The operation of the device is very simple. The odor of the insecticide or oil attracts the hog and they soon become accustomed to scratch themselves against the rub bars. A mere lateral pressure or a pressure in a horizontal plane against one of the bars will not unseat a valve and forms a special feature of my invention. When a hog rubs itself there is exerted a lateral pressure, as well as an upward pressure, and it is the upward pressure of the animal that results in the bars A, being carried upward to unseat the valves. Under these conditions should a hog lie against one of the bars A, the valves will not be unseated. The use of these rubbing posts is found beneficial in that scurvy, hog lice, and skin diseases are prevented or cured.

The rub bars A, are of such a length that they come so low that even a small hog, as well as a large hog may use the rubbing post constructed according to my invention, and little pigs can operate the device as readily as a large hog.

In referring to Figs. 1 and 2, it will be noticed that there is a slight play between the upper end of the necks 19, and the lower ends of the valve stems 11. In lying against the rubbing post a hog might slightly raise a rub bar A, but this upward movement would not be sufficient to unseat a valve.

A rubbing post embodying my invention is simple and inexpensive in construction, and both durable and efficient in operation, and the rub bars of the post may be positively operated with ease, accuracy and despatch, to insure a beneficial distribution of the insecticide or oil.

Having thus described my said invention, what I claim as new and desire to secure by Letters Patent is:

1. In combination, a standard, a receptacle secured to said standard having an escape opening, a valve normally closing said opening, a bar capable of being vertically reciprocated located below said valve to unseat the same, means for guiding said bar at its upper end and a link pivotally securing said bar to said standard, said link limiting the upward movement of said bar.

2. In combination, a standard, a receptacle secured to said standard having an escape opening, a spring actuated valve normally closing said opening, a bar capable of being vertically reciprocated to unseat said valve, means for guiding said bar at its upper end and links pivotally securing said bar to said standard, and limiting the upward movement of said bar.

3. In combination, a standard ending in a receptacle having an escape opening, a spring actuated valve normally closing said opening, a bar, means for guiding said bar at its upper end, and links securing said bar to said standard, said bar being capable of being vertically reciprocated to unseat said valve, said bar in its upward movement contacting with said standard, thus limiting the upward movement of said bar.

4. In combination, a standard, ending in a receptacle having an escape opening, a spring actuated valve normally closing said opening, a bar, means for guiding said bar at its upper end, links pivotally securing said bar to said standard, said bar being capable of being moved upward to unseat said valve, said standard limiting the upward movement of said bar.

5. The combination with a standard ending in a receptacle having an escape opening, with a yoke located below said opening, of a spring actuated valve normally closing said opening, and ending above said yoke, a link pivotally secured to said standard, a rub bar vertically reciprocating within said yoke and secured at its lower end to said link, said link limiting the downward movement of said bar, said bar being provided with a plurality of downwardly extending drain channels, each communicating with a rib extending beyond the sides and outer edge of said bar.

6. In combination, a standard ending in a receptacle having an escape opening, a yoke being located below said opening, a valve normally closing said opening, a link pivotally secured to said standard, a rub bar pivotally secured to said link having its upper end reciprocating within said yoke and arranged to unseat said valve, said link limiting the downward movement of said bar, said bar being provided with a plurality of drain channels, each ending in a rib extending beyond the sides and outer edge of said bar, and means limiting the upward movement of said bar.

7. A standard cruciform in cross-section ending in a receptacle having drain openings, yokes extending from said standard, a plurality of links pivoted to said standard, vertically reciprocating rub bars, each reciprocating at its upper end within a yoke and pivotally secured at its lower end to a link, said links limiting the downward movement of said rub bars, each of said rub bars being provided with a diagonally positioned rib and a drain channel, each rib forming a continuation of a drain channel, said ribs and drain channels inclining downward from the rear edge of the bar, and valves within said openings each valve being arranged for coaction with a rub bar.

8. A supporting member having a receptacle at its upper end provided with an escape opening, a rib extending from said member, a yoke forming a part of said rib at the upper end, a link secured to said rib near the lower end, a valve within said opening, a rub bar reciprocating within said yoke, having its lower end secured to said link, arranged to unseat said valve, said link being pivoted to said rub bar and limiting the downward movement of said rub bar, said rib serving as means to limit the upward movement of said rub bar.

9. A standard, a reservoir formed at the upper end of said standard having a drain opening, a spring actuated valve within said opening normally closing the same, a rub bar slidably secured at its upper end and pivotally secured at its lower end to said standard whereby on actuating said rub bar said upper end contacts with said valve to unseat the same.

10. The combination with an oil-tank, of a valve communicating therewith, a rubbing-plate, a fixed bracket, and means interposed between said plate and bracket whereby an animal bearing against the former will cause its lower portion to travel in the arc of a circle and its upper end to rise whereby to operate said valve.

11. In a device of the character described, a tank, means for supporting said tank, a valve communicating with said tank, a rubbing plate adapted to unseat said valve, a hinge link supporting said plate, and means for guiding said rubbing plate.

In testimony whereof I affix my signature, in the presence of two witnesses.

REUBIN H. BLOOMER.

Witnesses:
W. S. COOPER,
H. M. COOPER.

Copies of this patent may be obtained for five cents each, by addressing the "Commissioner of Patents, Washington, D. C."